(12) United States Patent
Yoshida et al.

(10) Patent No.: US 10,300,559 B2
(45) Date of Patent: May 28, 2019

(54) LASER DRILLING METHOD AND APPARATUS WITH RADIATION OUTPUT CHANGES IN A RADIAL DIRECTION DURING DRILLING OF A WORKPIECE

(71) Applicants: Mitsutaka Yoshida, Nagakute (JP); Natsuki Sugiyama, Nisshin (JP); Akio Sato, Toyota (JP); Kenji Kidera, Toyota (JP); Masaru Setodoi, Miyoshi (JP); Taku Yamaguchi, Takahama (JP)

(72) Inventors: Mitsutaka Yoshida, Nagakute (JP); Natsuki Sugiyama, Nisshin (JP); Akio Sato, Toyota (JP); Kenji Kidera, Toyota (JP); Masaru Setodoi, Miyoshi (JP); Taku Yamaguchi, Takahama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 521 days.

(21) Appl. No.: 14/890,030

(22) PCT Filed: May 6, 2014

(86) PCT No.: PCT/IB2014/000742
§ 371 (c)(1),
(2) Date: Nov. 9, 2015

(87) PCT Pub. No.: WO2014/181173
PCT Pub. Date: Nov. 13, 2014

(65) Prior Publication Data
US 2016/0082549 A1    Mar. 24, 2016

(30) Foreign Application Priority Data
May 9, 2013   (JP) .................................. 2013-099147

(51) Int. Cl.
*B23K 26/384* (2014.01)
*B23K 26/0622* (2014.01)
(Continued)

(52) U.S. Cl.
CPC ........ *B23K 26/384* (2015.10); *B23K 26/0622* (2015.10); *B23K 26/0626* (2013.01);
(Continued)

(58) Field of Classification Search
CPC ............ B23K 2201/001; B23K 26/381; B23K 26/382; B23K 26/383; B23K 26/384;
(Continued)

(56) References Cited

U.S. PATENT DOCUMENTS 6,070,813 A * 6/2000 Durheim ................ B23K 26/18
239/533.2
2001/0052659 A1  12/2001 Nakai et al.
(Continued)

FOREIGN PATENT DOCUMENTS

CN       103477427 A   12/2013
EP       1 353 773 B1   4/2010
(Continued)

OTHER PUBLICATIONS

International Search Report dated Oct. 9, 2014 in PCT/IB2014/000742 Filed May 6, 2014.

*Primary Examiner* — Tu B Hoang
*Assistant Examiner* — Diallo I Duniver
(74) *Attorney, Agent, or Firm* — Oblon, McClelland, Maier & Neustadt, L.L.P.

(57) ABSTRACT

A laser drilling method is a laser drilling method for performing drilling on a workpiece by use of a laser beam. The laser drilling method includes, after machining a through hole by radiating the laser beam to the workpiece (S100), scanning with the laser beam centered around the through (Continued)

hole toward a radial direction while changing a radiation output of the laser beam (S200).

5 Claims, 8 Drawing Sheets

(51) Int. Cl.
    *B23K 26/382*     (2014.01)
    *B23K 26/06*     (2014.01)
    *B23K 26/073*     (2006.01)
    *B23K 26/082*     (2014.01)

(52) U.S. Cl.
    CPC ........ *B23K 26/0736* (2013.01); *B23K 26/082* (2015.10); *B23K 26/382* (2015.10); *B23K 26/389* (2015.10)

(58) Field of Classification Search
    CPC ................ B23K 26/388; B23K 26/389; B23K 26/0622; B23K 26/0626; B23K 26/0736; B23K 26/082; B23K 26/10; B23K 26/103
    USPC ................ 219/121.7–121.76, 121.78–121.81
    See application file for complete search history.

(56) References Cited

U.S. PATENT DOCUMENTS

| | | |
|---|---|---|
| 2004/0164060 A1 | 8/2004 | Maeda et al. |
| 2005/0173388 A1* | 8/2005 | Lavers ..................... B23H 9/10 219/121.71 |
| 2011/0298156 A1 | 12/2011 | Hooper et al. |

FOREIGN PATENT DOCUMENTS

| | | |
|---|---|---|
| JP | 5 42337 | 2/1993 |
| JP | 2000 71086 | 3/2000 |
| JP | 2002 1559 | 1/2002 |
| JP | 2004 243404 | 9/2004 |
| JP | 2013 87757 | 5/2013 |
| WO | WO 2004/011186 A1 | 2/2004 |

* cited by examiner

LASER DRILLING METHOD AND APPARATUS WITH RADIATION OUTPUT CHANGES IN A RADIAL DIRECTION DURING DRILLING OF A WORKPIECE

BACKGROUND OF THE INVENTION

1. Field of the Invention

The present invention relates to a laser drilling method and apparatus.

2. Description of Related Art

With regard to a drilling method using a laser beam, Japanese Patent Application Publication No. 2004-243404 (JP 2004-243404 A) describes a method for enlarging a hole while performing scanning with a laser beam.

However, in the laser drilling method of a related art, an inclination angle of the hole thus enlarged is 10 degrees at the maximum, and there is a possibility machining cannot be performed when a necessary inclination angle of a hole is larger than that. For example, in a case where an injection port of a fuel injection valve of an injector is machined, it is necessary for an inclination angle of a hole to be 40 degrees at the maximum. However, in the related art, it is difficult to machine such a large inclination angle. Note that, in the laser drilling method in the related art, in a case where the inclination angle of the hole is inclined at 10 degrees or more, it is necessary to use a larger condenser lens for a laser beam, or to shorten a distance from a lens to a workpiece, thereby resulting in that a laser drilling apparatus becomes very expensive.

In the meantime, such a technique to perform drilling by use of a press without using a laser beam is considered, but drilling using a press cannot achieve expected accuracy for a surface roughness of a surface of a hole, so that there is a possibility that the surface of the hole cannot be finished smoothly. For example, in a case where drilling is performed by use of a press on an injection port of a fuel injection valve, there is a possibility that a requested minute surface roughness cannot be satisfied.

SUMMARY OF THE INVENTION

The present invention provides a laser drilling method and apparatus each of which is able to increase a degree of freedom of an inclination angle of a hole and is able to finish a surface of the hole smoothly.

A laser drilling method according to one embodiment is a laser drilling method for performing drilling on a workpiece by use of a laser beam, and the laser drilling method includes: scanning with the laser beam centered around a through hole toward a radial direction while changing a radiation output of the laser beam, after machining the through hole by radiating the laser beam to the workpiece.

Hereby, it is possible to increase a degree of freedom of an inclination angle of a hole and to finish a surface of the hole smoothly.

Further, the radiation output of the laser beam may be changed to be smaller as the laser beam is distanced from the through hole in the radial direction. Hereby, it is possible to adjust a depth of an inclination angle of the through hole to a desired depth.

Furthermore, the laser beam may be radiated in an idling manner at a position inside a diameter of the through hole, after machining the through hole. This makes it possible to improve machining efficiency.

Further, a pulse energy of the laser beam, a repetition frequency of a pulse interval of a pulse of the laser beam, a scanning speed of the laser beam, and a radiation time in the scanning with the laser beam may be changed so as to change the radiation output of the laser beam.

Furthermore, the laser beam may be radiated to the workpiece so that a shape of a bottom-side hole of the through hole and a shape of an upper-side hole of the through hole have different phases in a top view.

Further, the laser beam may be radiated to the workpiece so that a shape of the through hole is a circular shape or an elliptical shape in a top view.

Furthermore, the scanning with the laser beam may be performed in a spiral manner at the time of the scanning with the laser beam centered around the through hole toward the radial direction.

A laser drilling apparatus according to another embodiment is a laser drilling apparatus for performing drilling on a workpiece by use of a laser beam, and the laser drilling apparatus includes: a control section configured to scanning with the laser beam centered around the through hole toward a radial direction while changing a radiation output of the laser beam, after machining a through hole by radiating the laser beam to the workpiece.

Hereby, it is possible to increase a degree of freedom of an inclination angle of a hole and to finish a surface of the hole smoothly.

According to the present invention, it is possible to provide a laser drilling method and apparatus each of which is able to increase a degree of freedom of an inclination angle of a hole and is able to finish a surface of the hole smoothly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes concrete embodiments to which the present invention is applied in detail with reference to the drawings. Note that, in the following description, redundant descriptions are omitted as needed for clarification of the description.

Figure 1:
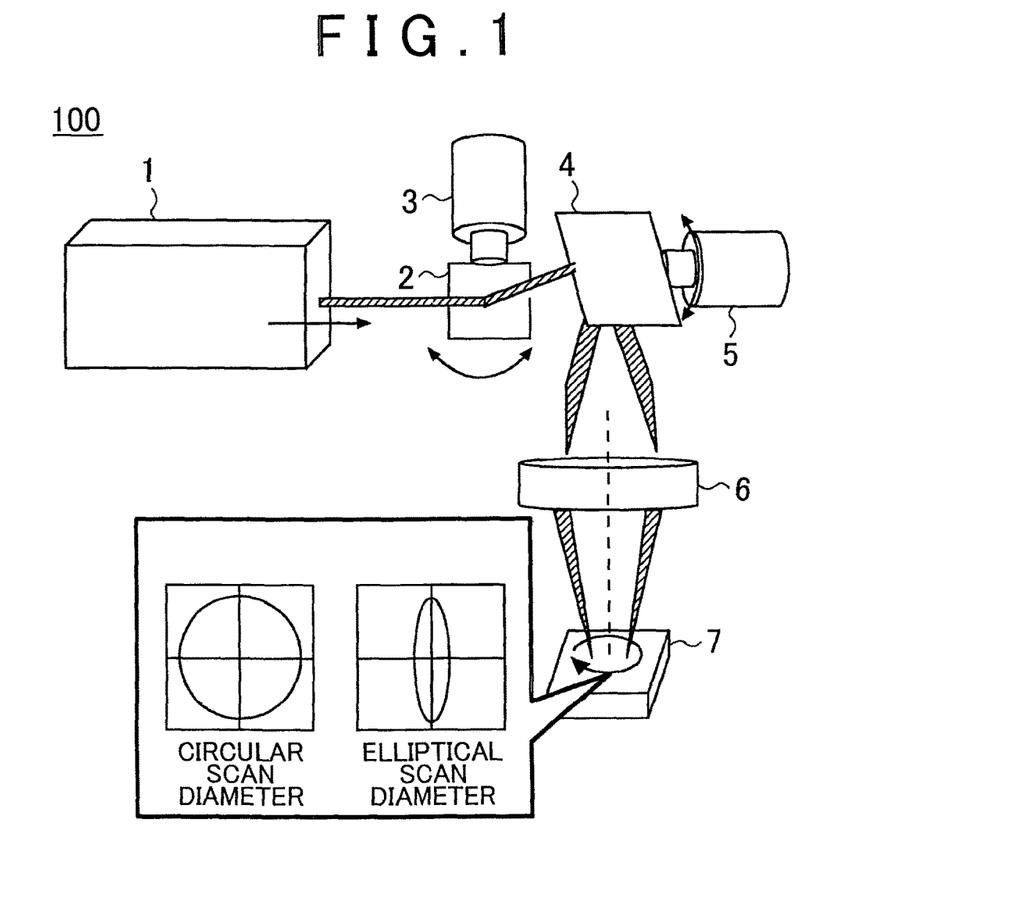
FIG. 1 is a configuration diagram illustrating an example of a laser drilling apparatus according to Embodiment 1.

<Embodiment 1> FIG. 1 is a configuration diagram illustrating an example of a laser drilling apparatus 100 according to the present embodiment. The laser drilling apparatus 100 includes a laser oscillator 1, a galvanometer mirror 2, a motor 3, a galvanometer mirror 4, a motor 5, a condenser lens 6, and a control section (not shown) that drive-controls each driving section such as the laser oscillator 1 or the motor.

The laser oscillator 1 is an ultrashort pulse laser that outputs a laser beam LA as pulsed light. In the present embodiment, the laser oscillator 1 outputs a picosecond laser beam as the laser beam LA.

The galvanometer mirror 2 polarizes, in a given direction, the laser beam LA emitted from the laser oscillator 1. The motor 3 rotates the galvanometer mirror 2 in a given direction. The motor 3 is controlled to rotate so that the galvanometer mirror 2 is rotationally-driven. Hereby, it is possible to polarize the laser beam LA emitted from the laser oscillator 1, in a desired direction within a predetermined range.

The galvanometer mirror 4 polarizes, in a given direction, the laser beam LA polarized by the galvanometer mirror 2. The motor 5 rotates the galvanometer mirror 4 in a given direction. The motor 5 is controlled to rotate so that the galvanometer mirror 4 is rotationally driven. Hereby, it is possible to polarize the laser beam LA polarized by the galvanometer mirror 2, in a desired direction within a predetermined range.

The condenser lens 6 condenses the laser beam LA polarized by the galvanometer mirror 4 on a surface of a workpiece 7. In the present embodiment, the laser beam LA is perpendicularly condensed on the surface of the workpiece 7.

The laser drilling apparatus 100 polarizes the laser beam LA emitted from the laser oscillator 1 by the galvanometer mirror 2 and the galvanometer mirror 4, condenses the polarized laser beam LA by the condenser lens 6, and radiates the condensed laser beam LA to the workpiece 7. Accordingly, the laser drilling apparatus 100 radiates the laser beam LA emitted from the laser oscillator 1, such that the laser beam LA is aligned by the galvanometer mirrors 2, 4 at a given position in a machining region of the surface of the workpiece 7. Then, the laser drilling apparatus 100 swings the galvanometer mirrors 2, 4 in respective directions shown by arrows in the figure in a reciprocating manner, so as to performing scanning with the laser beam LA on the machining region of the surface of the workpiece 7, thereby performing drilling on the workpiece 7.

The laser drilling apparatus 100 performs scanning on the workpiece 7 with the laser beam LA so that a locus of the laser beam LA draws a desired shape. The lower-left view in FIG. 1 is a schematic view illustrating the locus of the laser beam LA at the time when the laser drilling apparatus 100 performs scanning with the laser beam LA. An example illustrated in this figure illustrates a circular scan diameter of a case where the locus of the laser beam LA has a circular shape, and an elliptical scan diameter of a case where the locus of the laser beam LA has an elliptical shape. Note that the locus of the laser beam LA is not limited to them, and the scanning may be performed so that, the laser beam draws other given shapes.

Figure 2:
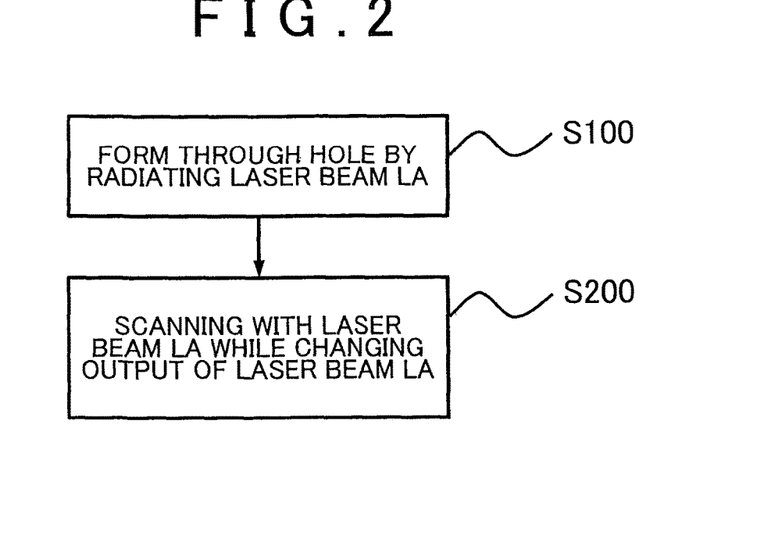
FIG. 2 is a flow chart illustrating an example of a flow of a machining process of a laser drilling method according to Embodiment 1.

Referring now to FIG. 2, a flow of the machining process of the laser drilling method according to the present embodiment is described. Initially, the laser drilling apparatus 100 radiates the laser beam LA to the workpiece 7 so as to machine a through hole (step S100). Subsequently, the laser drilling apparatus 100 performs scanning with the laser beam LA from the through hole toward a radial direction while changing a radiation output of the laser beam LA (step S200).

Thus, after the through hole is formed, the scanning is performed with the laser beam LA in the radial direction while the radiation output of the laser beam LA is changed, thereby making it possible to enlarge an inclination angle of the hole to a given angle. This makes it possible to increase a degree of freedom of the inclination angle of the hole. Further, since the scanning is performed with the laser beam LA in the radial direction while the radiation output of the laser beam LA is changed, it is possible to improve a surface roughness of a surface of the hole to desired accuracy. This makes it possible to finish the surface of the hole smoothly.

Figure 3A:
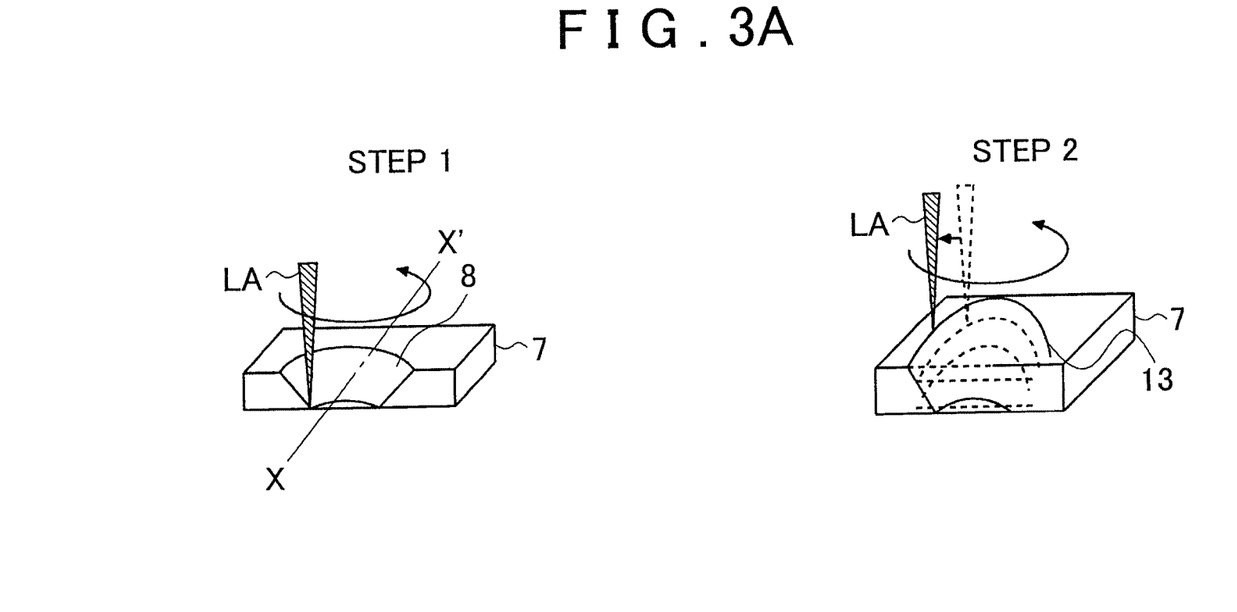
FIG. 3A is a view to describe the machining process of the laser drilling method according to Embodiment 1 in detail.
Figure 3B:
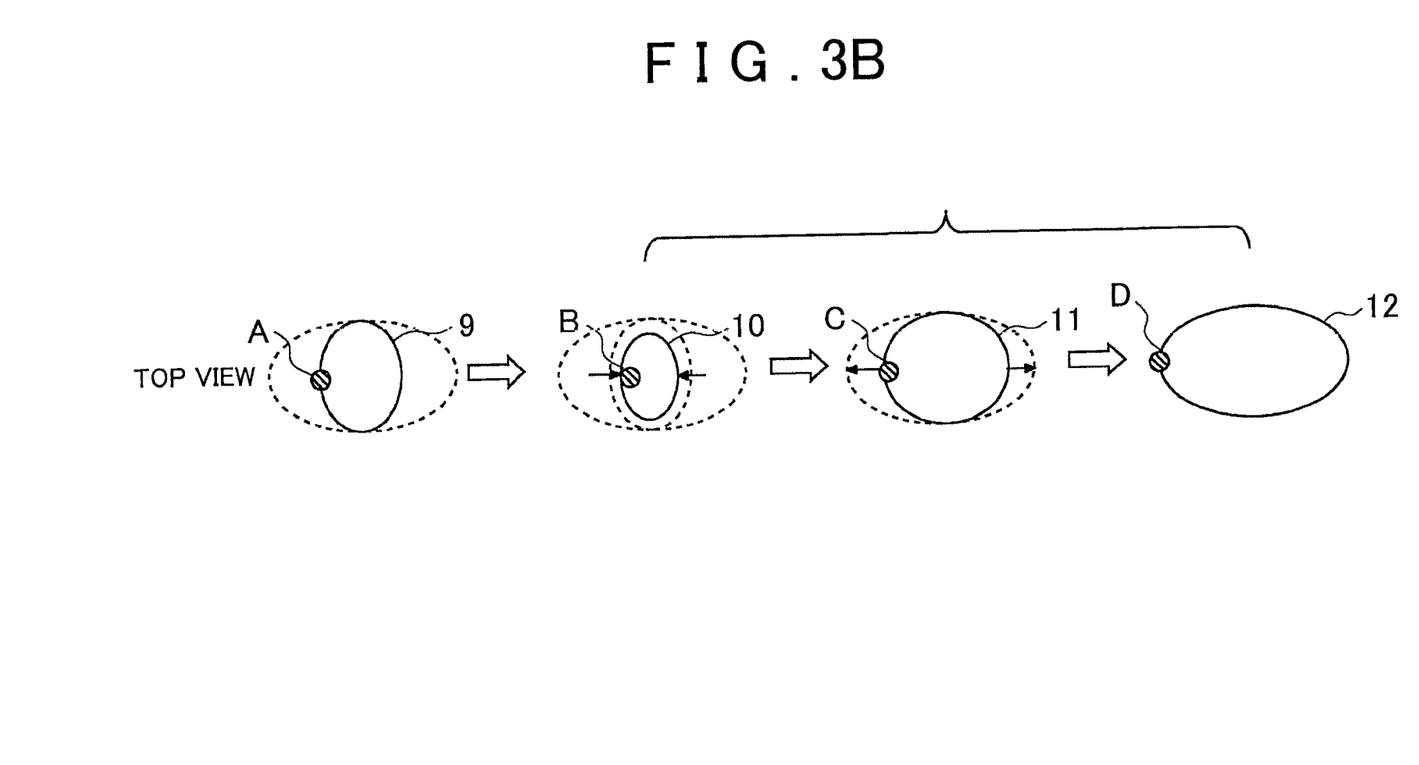
FIG. 3B is a view to describe the machining process of the laser drilling method according to Embodiment 1 in detail.
Figure 3C:
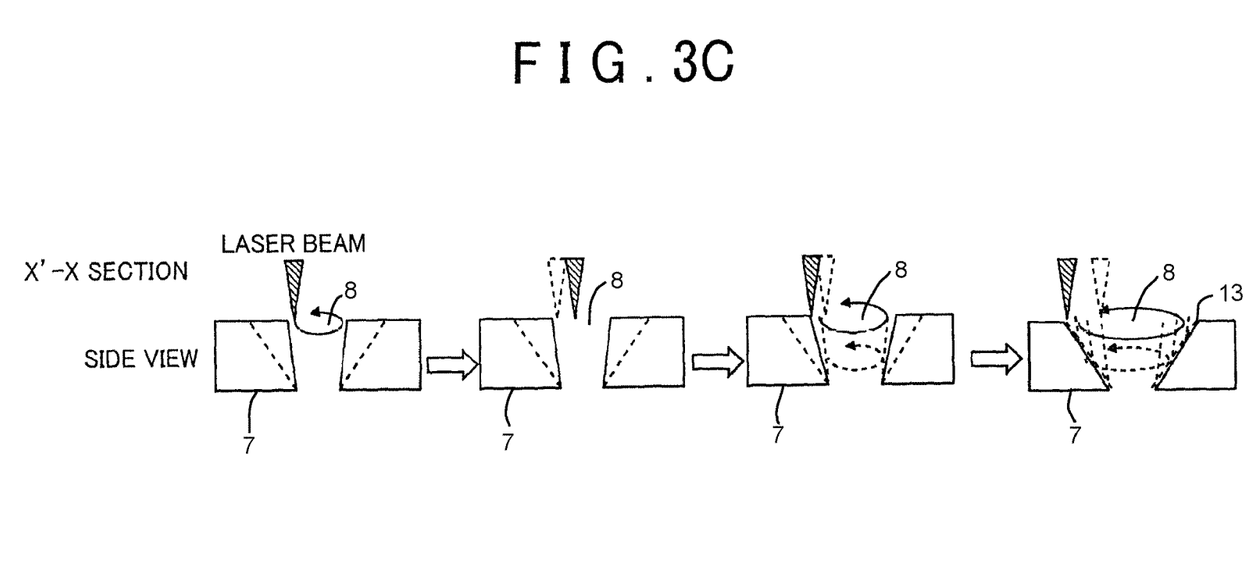
FIG. 3C is a view to describe the machining process of the laser drilling method according to Embodiment 1 in detail.

Referring now to FIGS. 3A to 3C, the following describes the machining process of the laser drilling method according to the present invention in detail. As illustrated in FIG. 3A, the laser drilling method according to the present invention includes step 1 illustrated in the left view in the figure, and step 2 illustrated in the right view in the figure. Step 1 is a step of radiating the laser beam LA to the workpiece 7 so as to machine a through hole 8, and corresponds to S100 illustrated in FIG. 2. Step 2 is a step of performing scanning with the laser beam LA from the formed through hole 8 toward the radial direction while changing the radiation output of the laser beam LA, and corresponds to S200 illustrated in FIG. 2. Note that the radial direction indicates a direction away from the through hole 8 formed in step 1.

FIGS. 3B and 3C are schematic views to describe contents of the machining process in step 1 and step 2 illustrated in FIG. 3A in detail. FIG. 3B is a top view schematically illustrating a shape of a bottom-side hole of the through hole 8 or the locus of the laser beam LA. FIG. 3C is a sectional view schematically illustrating the workpiece 7 with regard to a line X-X' in FIG. 3A.

Initially, step 1 illustrated in the left view in FIG. 3A is described with reference to the leftmost schematic view in FIG. 3B and the leftmost schematic view in FIG. 3C. As illustrated in the left view in FIG. 3A, the laser drilling apparatus 100 radiates the laser beam LA to the workpiece 7 so as to form the through hole 8 that penetrates through the workpiece 7. As illustrated in the view in the left view in FIG. 3A and the leftmost view in FIG. 3C, the laser drilling apparatus 100 forms the through hole 8 by performing rotational scanning with the laser beam LA in a rotating arrow direction (a circumferential direction) shown herein. In the present embodiment, as illustrated in the leftmost schematic view in FIG. 3B, a shape 9 of the bottom-side hole of the through hole 8 thus formed is an elliptical shape. Note that, in the leftmost schematic view in FIG. 3B, a spot of the laser beam LA in the scanning is indicated by A.

Note that the shape 9 of the bottom-side hole of the through hole 8 is not limited to the elliptical shape, and can be formed in a given circular shape or a given elliptical shape having a desired diameter. Further, a scanning method with the laser beam LA at the time of forming the through hole 8 is not limited to the rotational scanning, and any other well-known scanning method may be employed provided that the scanning method is able to form the shape 9 of the bottom-side hole of the through hole 8 in a given circular shape or a given elliptical shape having a desired diameter.

Then, in step 2 illustrated in the right view in FIG. 3A, after the through hole 8 is formed, the laser drilling apparatus 100 performs scanning with the laser beam LA from the through hole 8 thus formed toward the radial direction while changing the radiation output of the laser beam LA, as illustrated in the figure. A state of the scanning with the laser beam LA and the machining of the through hole 8 at this time is described with reference to the second to fourth schematic views from the left in FIG. 3B and the second to fourth schematic views from the left in FIG. 3C.

Initially, as illustrated in the second schematic view from the left in FIG. 3B and the second schematic view from the left in FIG. 3C, after forming the through hole 8, the laser drilling apparatus 100 performs scanning with the laser beam LA on an inner region of the shape 9 of the bottom-side hole of the through hole 8. The second schematic view from the left in FIG. 3B illustrates a locus 10 of the laser beam LA at this time. Further, in synchronization with such scanning with the laser beam LA, the laser drilling apparatus 100 decreases a level of the radiation output of the laser beam LA from an output level at the time of forming the through hole 8, to a predetermined output level. Note that, in the second schematic view from the left in FIG. 3B, a spot of the laser beam LA in the scanning is indicated by B.

Note that the scanning with the laser beam LA at this time is not limited to the rotational scanning, and the laser beam LA may be radiated to a predetermined fixed position inside a diameter of the bottom-side hole of the through hole 8.

As such, at a timing when the level of the radiation output of the laser beam LA is decreased to the predetermined level from the level at the time of forming the through hole 8, the laser drilling apparatus 100 radiates the laser beam LA not directly to the workpiece 7, but in an idling manner in a region inside the shape 9 of the bottom-side hole of the through hole 8.

Hereby, in a case where the laser beam LA is radiated so as to form the through hole 8 in the workpiece 7 and then the scanning with the laser beam LA is performed toward the radial direction centered around the through hole 8 thus formed, it is possible to surely prevent the laser beam LA from being radiated to the shape 9 of the bottom-side hole of the through hole 8 thus formed. Further, when the through hole 8 is formed, the laser beam LA of a high output level is used, thereby making it possible to from the through hole 8 in a short time.

Subsequently, as illustrated in the third schematic view from the left in FIG. 3B and the third schematic view from the left in FIG. 3C, after decreasing the radiation output of the laser beam LA to the predetermined level, the laser drilling apparatus 100 performs scanning with the laser beam LA toward the radial direction from the through hole 8 thus formed. As illustrated in the right view in FIG. 3A and the third to fourth views from the left in FIG. 3C, for example, the laser drilling apparatus 100 performs rotational scanning with the laser beam LA in rotating arrow directions in the views and performs scanning the laser beam LA so as to enlarge a locus of the laser beam LA in the radial direction. The third schematic view from the left in FIG. 3B illustrates a locus 11 of the laser beam LA in the middle of this scanning, and the locus 11 draws a perfect circle shape. Further, the fourth schematic view from the left in FIG. 3B illustrates a locus 12 of the laser beam LA at a timing when the scanning with the laser beam LA is finished, and the locus 12 draws an oblong elliptical shape. Further, the elliptical shape that the locus 12 draws corresponds to a shape 13 of an upper-side hole of the through hole 8. Note that, in the third and fourth schematic views from the left in FIG. 3B, spots of the laser beam LA at the time of scanning are indicated by C, D.

In the present embodiment, at the time of performing scanning with the laser beam LA, the laser drilling apparatus 100 performs the scanning from the through hole 8 toward the radial direction while rotating the laser beam LA in a circumferential direction. At this time, the laser drilling apparatus 100 radiates the laser beam LA from a center of the through hole 8 toward the radial direction in a spiral manner, for example. Note that the scanning with the laser beam is not limited to the spiral manner, and the laser beam LA may be radiated concentrically from the through hole 8 toward the radial direction.

Further, in synchronization with such scanning with the laser beam LA, the laser drilling apparatus 100 decreases the level of the radiation output of the laser beam LA as a scanning diameter of the laser beam LA is distanced from the through hole 8 in the radial direction. Hereby, the radiation output of the laser beam LA to be radiated to the workpiece 7 is changed to be smaller as the laser beam LA is distanced from the through hole 8 in the radial direction.

As illustrated in the right view in FIG. 3A and the third to fourth views from the left in FIG. 3C, according to such scanning, a depth of the surface of the through hole 8 to be scraped off by the laser beam LA becomes shallower as it goes away from the through hole 8 in the radial direction. As a result, it is possible to enlarge the inclination angle of the through hole 8 toward the radial direction after the through hole 8 is formed.

Further, after the through hole 8 is formed, the scanning with the laser beam LA is performed toward the radial direction from the through hole 8 thus formed, thereby making it possible to efficiently remove, from the through hole 8 thus formed, plasma and sublimated deposits on a machining surface of the through hole 8 in non-penetration machining illustrated in the third and fourth views from the left in FIG. 3C. Further, by scraping off the surface of the through hole 8 from the through hole 8 toward the radial direction (that is, from an inside to an outside), it is possible to efficiently remove sublimated deposits and the like toward the through hole 8 without depositing the sublimated deposits on the surface. This consequently makes it possible to improve machining efficiency.

Figure 4:
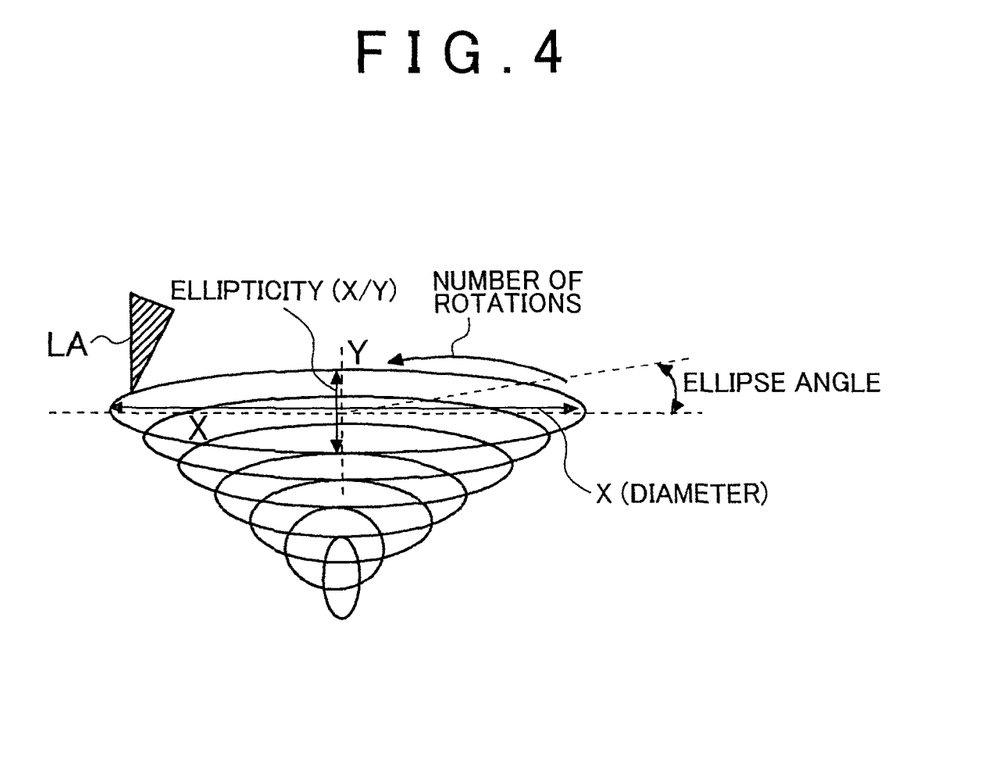
FIG. 4 is a view to describe definitions of control parameters related, to a locus of a laser beam LA according to Embodiment 1.
Figure 5:
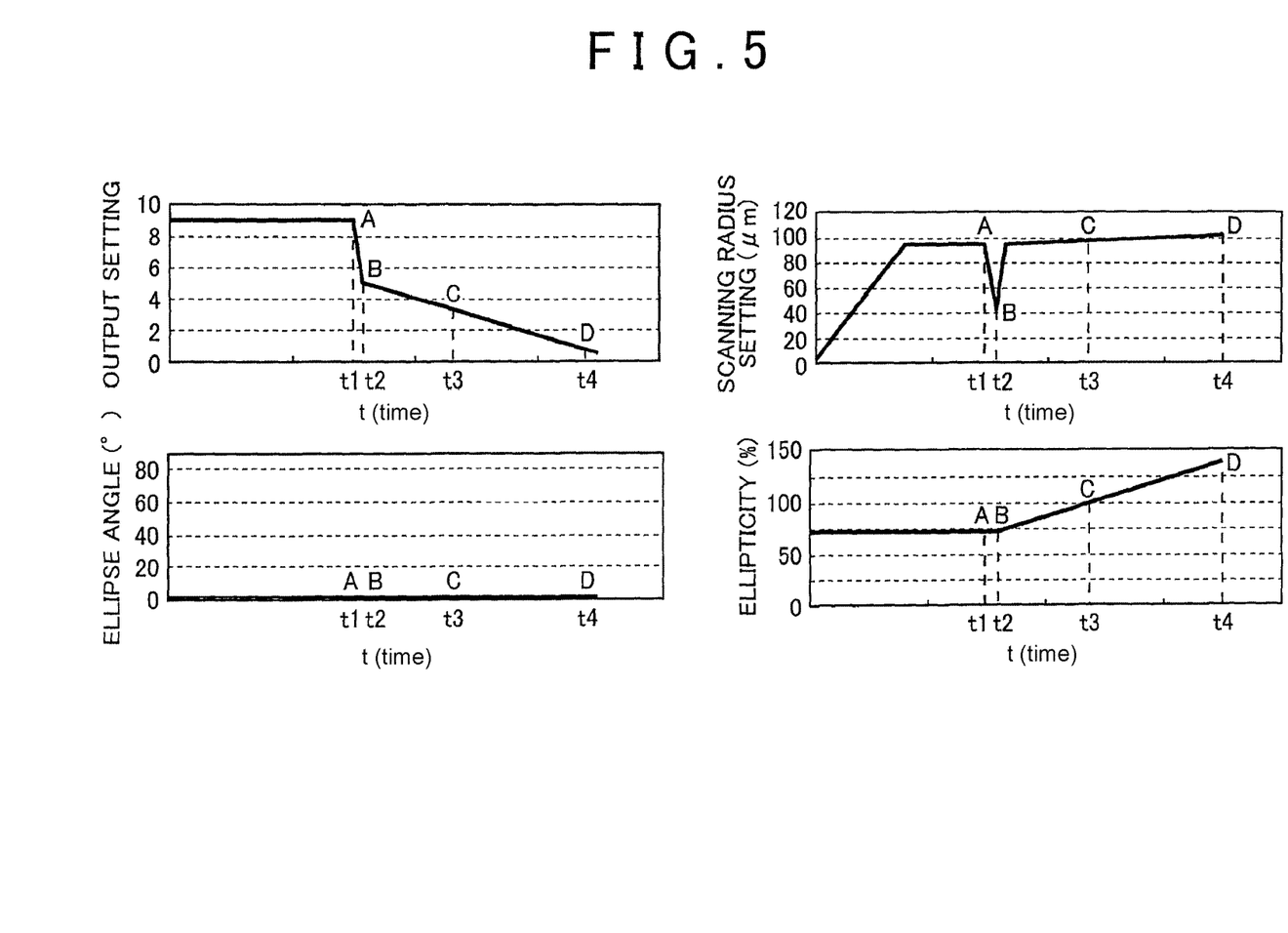
FIG. 5 is graphs illustrating settings of respective control parameters of the laser drilling apparatus according to Embodiment 1.

Referring now to FIGS. 4 and 5, the following describes those various control parameters (the radiation output of the laser beam LA, an ellipse angle, a scanning radius, an ellipticity) of the laser drilling apparatus 100 which are set at the time of drilling control.

FIG. 4 is a view to describe definitions of control parameters related to the locus of the laser beam LA. In FIG. 4, in a case where the locus of the laser beam LA has an elliptical shape (or a circular shape), X, Y respectively indicate a long diameter and a short diameter of the elliptical shape. The scanning radius indicates a magnitude of the long diameter X of the ellipse. The ellipticity indicates a rate of the long diameter to the short diameter (that is, X/Y). The number of rotations indicates the number of times of rotation scanning with the laser beam LA for one minute in the circumferential direction. The ellipse angle indicates a turning angle of the elliptical shape of the through hole 8 with respect to an X-axis (a right direction on a plane of paper) in a top view. In FIG. 4, a turning angle of the elliptical shape of the bottom-side hole of the through hole 8 with respect to the X-axis is zero. That is, an ellipse angle of an elliptical shape 9 of the bottom-side hole of the through hole 8 is zero. In view of this, an ellipse angle of an elliptical shape 13 of the upper-side hole of the through hole 8, also indicates a turning angle of the elliptical shape 13 of the upper-side hole of the through hole 8 with respect to the elliptical shape 9 of the bottom-side hole of the through hole 8.

FIG. 5 is graphs illustrating settings of respective control parameters of the laser drilling apparatus 100 at the time of drilling. In each graph of FIG. 5, times 0 to t1 correspond to step 1 of radiating the laser beam LA to the workpiece 7 so as to machine the through hole 8. Further, a step from the time t1 to a time t4 corresponds to the step of performing scanning with the laser beam LA from the formed through hole 8 toward the radial direction while decreasing the radiation output of the laser beam LA.

As illustrated in the upper-left graph of FIG. 5, the laser drilling apparatus 100 radiates the laser beam at a given high output level from the time 0 to the time t1. Here, the given high output level is an output level that allows the laser beam to penetrate through the workpiece 7. Further, as illustrated in the upper-right graph of FIG. 5, the laser drilling apparatus 100 performs scanning with the laser beam LA toward the radial direction of the through hole 8 from the time 0 to the time t1 by increasing the scanning radius of the laser beam. Further, as illustrated in the lower-right graph of FIG. 5, the laser drilling apparatus 100 keeps the ellipticity at a predetermined value without any change from the time 0 to the time t1. Note that, as illustrated in the lower-left graph of FIG. 5, the laser drilling apparatus 100 keeps the ellipse angle at zero without any change from the time 0 to the time t1.

Hereby, the laser drilling apparatus 100 forms the shape 9 of the bottom-side hole of the through hole 8 as illustrated in the left view in FIG. 3A and the leftmost view in FIG. 3C. The shape 9 is an elliptical shape that satisfies the ellipse angle and the ellipticity respectively shown in the lower-left graph and the lower-right graph in FIG. 5.

Step 2 from the time t1 to the time t4 includes a step from the time t1 to the time t2 and a step from the time t2 to the time t4 (a step from the time t2 to the time t3 and a step from the time t3 to the time t4).

First described is the step from the time t1 to the time t2. As illustrated in the upper-left graph of FIG. 5, the laser drilling apparatus 100 decreases the level of the radiation output of the laser beam LA from the high output level at the time of forming the through hole 8 to a given output level from the time 1 to the time t2. Here, the given output level is an output level that does not allow the laser beam to penetrate through the workpiece 7. Further, as illustrated in the upper-right graph of FIG. 5, the laser drilling apparatus 100 decreases the scanning radius of the laser beam LA from the time t1 to the time t2 so that the scanning radius is smaller than that at the time t1. Note that, as respectively shown in the lower-left graph and the lower-right graph of FIG. 5, the laser drilling apparatus 100 keeps the ellipse angle and the ellipticity at original values without any change from the time t1 to the time t2.

Hereby, as illustrated in the second schematic view from the left in FIG. 3B and the second schematic view from the left in FIG. 3C, after forming the through hole 8, the laser drilling apparatus 100 performs scanning with the laser beam LA in the region inside the shape 9 of the bottom-side hole of the through hole 8.

Next will be described the step from the time t2 to the time t4. The step from the t2 to the time t4 corresponds to the step of performing scanning with the laser beam LA from the formed through hole 8 toward the radial direction while decreasing the radiation output of the laser beam LA.

As illustrated in the upper-left graph of FIG. 5, the laser drilling apparatus 100 starts with the given output level at the time t2 as the level of the radiation output of the laser beam LA, and further decreases the level of the radiation output from the time 2 to the time 4. Further, as illustrated in the upper-right graph of FIG. 5, the laser drilling apparatus 100 performs scanning with the laser beam LA toward the radial direction of the through hole 8 from the time t2 to the time t4 by increasing the scanning radius of the laser beam. Further, as illustrated in the lower-right graph of FIG. 5, the laser drilling apparatus 100 increases the ellipticity from the time t2 to the time t4. Note that, as illustrated in the lower-left graph of FIG. 5, the laser drilling apparatus 100 keeps the ellipse angle at zero without any change from the time t2 to the time t4.

By performing such scanning, the laser drilling apparatus 100 draws the locus 11 of the laser beam LA as illustrated in the third view from the left in FIG. 3B, at the time t3. Further, the laser drilling apparatus 100 draws the locus 12 of the laser beam LA as illustrated in the fourth view from the left in FIG. 3B, at the time t4.

Hereby, from the time t2 to the time t4, the laser drilling apparatus 100 is able to enlarge the inclination angle of the through hole 8 toward the radial direction as illustrated in the right view in FIG. 3A and the third to fourth views from the left in FIG. 3C. Further, by changing the ellipticity as such, it is possible to form, as the shape 13 of the upper-side hole of the through hole 8, an elliptical shape having an ellipticity different from that of the elliptical shape 9 of the bottom-side hole of the formed through hole 8.

Note that the laser oscillator 1 is able to change the radiation output of the laser beam LA by controlling radiation control parameters. The radiation parameters include a pulse energy of the laser beam LA, a repetition frequency of a pulse interval of a pulse of the laser beam LA, a scanning speed of the laser beam LA, and a radiation time in the scanning with the laser beam LA. In view of this, it is possible to change the radiation output of the laser beam LA to be small by performing at least one of the following setting: setting the pulse energy of the laser beam LA to be small; setting the repetition frequency of the pulse interval of the pulse of the laser beam LA to be lower; setting the scanning speed in the rotational scanning with the laser beam LA to be slow; and setting the scanning time in the rotational scanning with the laser beam LA to be short. Further, in addition to the radiation control parameters, a spot diameter of the laser beam LA may be changed.

Figure 6:
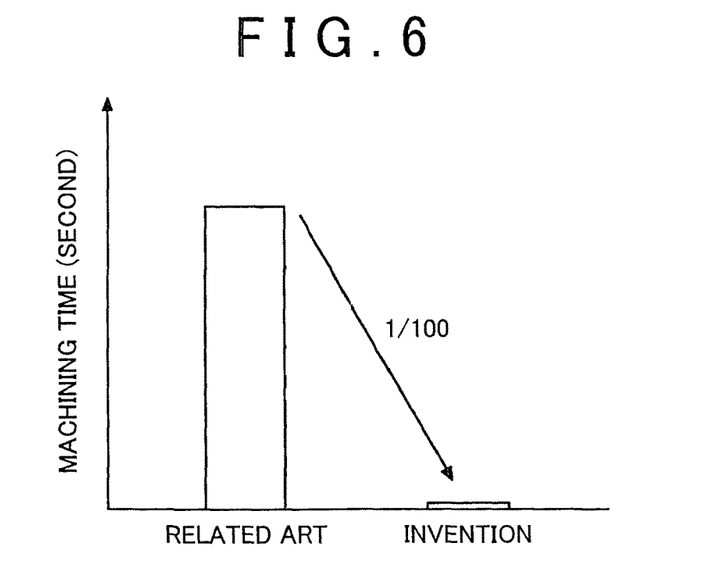
FIG. 6 is a graph illustrating a machining time according to Embodiment 1.
Figure 7:
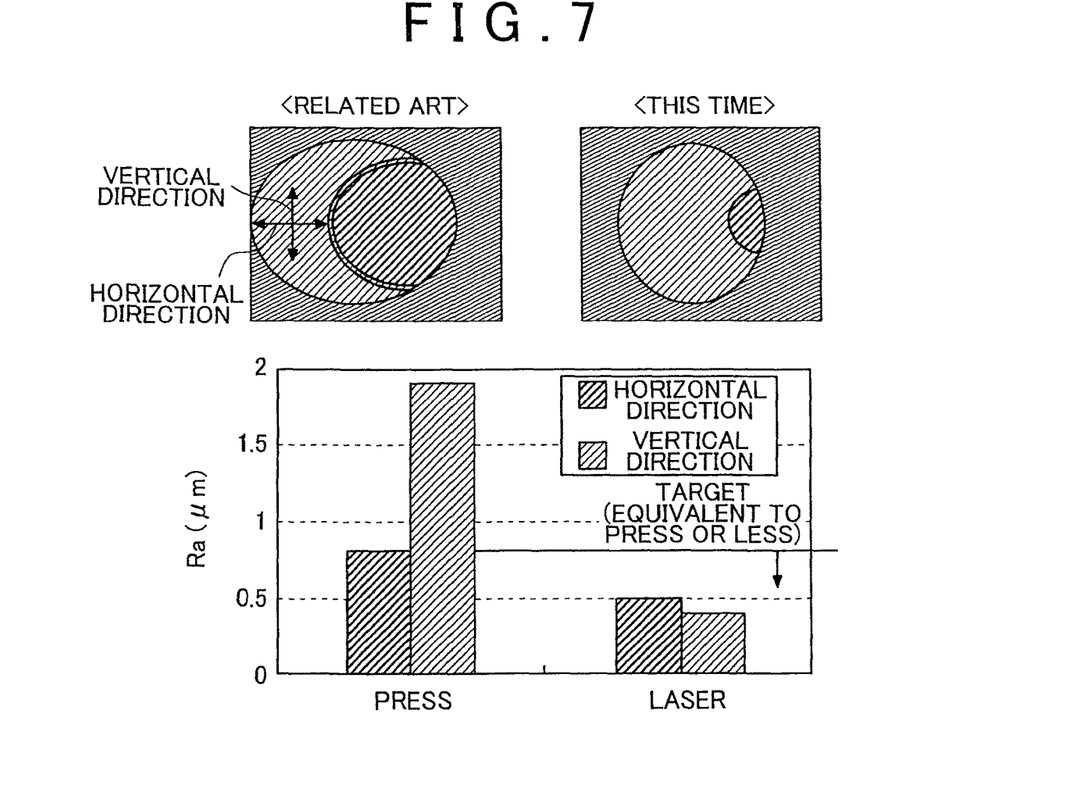
FIG. 7 is a graph illustrating a surface roughness according to Embodiment 1.

Referring to FIGS. 6 and 7, the following describes effects of the present embodiment. FIG. 6 is a graph illustrating a machining time for a laser drilling method according to the related art, and a machining time for the laser drilling method according to the present invention. Note that the following description deals with the technique described in Japanese Patent Application Publication No. 10-245711 A (JP 10-245711 A) as an example of the related art. Further, the following describes, as an example, a case where the through hole 8 to be formed is configured such that a phase of the elliptical shape 9 on a bottom side of the through hole 8 is displaced by 90 degrees from a phase of, the elliptical shape 13 on an upper side of the through hole 8.

In the related art, it is necessary to radiate a laser beam LA to a surface of a workpiece 7 to scrape off layers of the surface one by one, in order to form a through hole 8. However, in the related art, there is no method for efficiently removing deposits caused when the layers are scraped off one by one, and therefore, it is necessary to remove the deposits each time when one layer is scraped off. Because of this, only a few amount of the deposits can be scrape off at once, so that it takes much time to completely form the through hole 8. Further, in a case where the layers are scraped off one by one as such, it is difficult to secure a necessary surface roughness of the surface.

On the other hand, according to the present embodiment, it is possible to form the through hole 8 having the same shape in the workpiece 7 in a shorter time as mentioned earlier. Consequently, as illustrated in FIG. 6, it is possible to perform machining in a time that is about one hundredth shorter than a time required in the related art.

FIG. 7 is a graph illustrating a surface roughness in a case where drilling is performed by use of a press, and a surface roughness in a case where drilling is performed by use of the laser drilling method according to the present embodiment. Note that the upper-left view in FIG. 7 illustrates a horizontal direction (a right-and-left direction in a plane of paper) that is a pressing direction, and a vertical direction (an up-and-down direction in the plane of paper) that is perpendicular to the pressing direction, in the case where drilling is performed by use of a press. The upper-right view in FIG. 7 illustrates a horizontal direction (the right-and-left direction in the plane of paper) that is an incidence direction of the laser beam LA, and a vertical direction (the up-and-down direction in the plane of paper) that is perpendicular to the incidence direction, in the case where drilling is performed by use of the laser drilling method according to the present embodiment.

As shown on the left side of the graph in FIG. 7, in the case where drilling is performed by use of a press, a good surface roughness can be achieved in the horizontal direction in the drilling, but a surface roughness is largely decreased in the vertical direction that is perpendicular to the pressing direction.

On the other hand, as shown on the right side of the graph in FIG. 7, in the case where drilling is performed by use of the laser drilling method according to the present embodiment, a good surface roughness is achieved in the horizontal direction in the drilling. Further, a good surface roughness is achieved in the vertical direction. In view of this, according to the laser drilling method of the present embodiment, it is possible to achieve a good surface roughness in either of the horizontal direction and the vertical direction. Hereby, even in a case of drilling for an injection port of a fuel injection valve or the like, for example, it is possible to satisfy a requested surface roughness.

<Another Embodiment> The laser drilling apparatus 100 according to the above embodiment has been described in terms of a case where the condenser lens 6 is placed on a vertically upper side with respect to the workpiece 7, and the laser beam LA condensed by the condenser lens 6 is vertically radiated to the surface of the workpiece 7. However, the present invention is not limited to this. For example, the condenser lens 6 may be placed so as to be inclined at a given inclination angle to the vertically upper direction with respect to the workpiece 7, so as to radiate the laser beam LA to the surface of the workpiece 7 obliquely.

Figure 8:
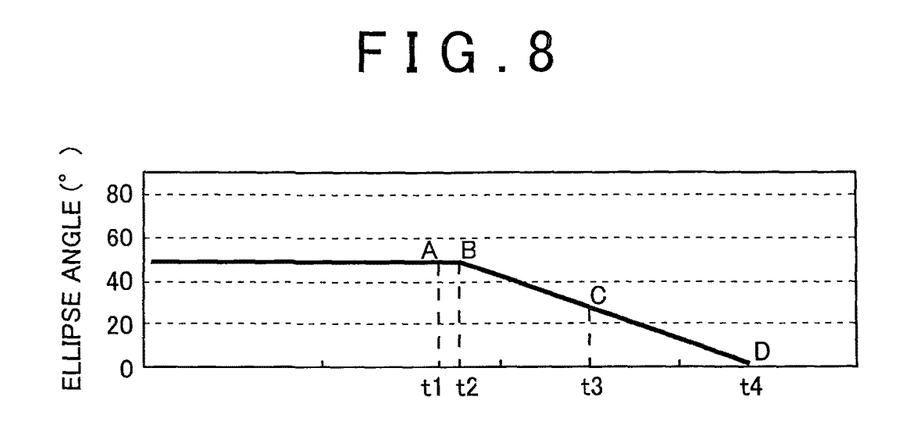
FIG. 8 is a graph illustrating a setting of an ellipse angle according to another embodiment.
Figure 9:
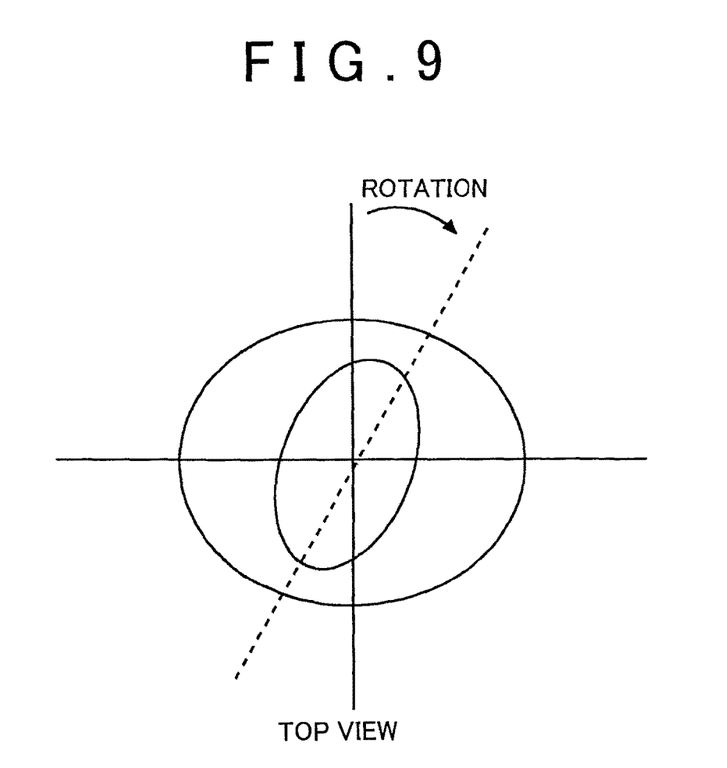
FIG. 9 is a view illustrating a shape of a through hole according to another embodiment.

Further, the settings of the control parameters shown in the respective graphs of FIG. 5 are just examples, and the present invention is not limited to them. For example, with regard to the ellipse angle, as illustrated in the graph of FIG. 8, the ellipse angle may be kept at a predetermined value without any change from the time 0 to the time t2, and may be decreased to zero from the time t2 to the time t4. In this case, as illustrated in FIG. 9, it is possible to form the elliptical shape 13 of the upper-side hole of the through hole 8 so as to be rotated with respect to the elliptical shape 9 of the bottom-side hole of the through hole 8 in a top view. That is, it is possible to form the shape 9 of the bottom-side hole of the through hole 8 and the shape 13 of the upper-side hole thereof so that they have different phases.

Further, with regard to the radiation output of the laser beam LA, for example, when a speed to decrease the output level after the time t2 is increased, it is possible for the depth of the surface of the through hole 8 to be scraped off by the laser beam LA to be further shallower from the through hole 8 toward the radial direction. This makes it possible to achieve a steeper inclination angle of the through hole 8. Further, when the speed to decrease the output level after the time t2 is further decreased, it is possible to further deepen the depth of the surface of the through hole 8 to be scraped off by the laser beam LA from the through hole 8 toward the radial direction. This makes it possible to achieve a more gradual inclination angle of the through hole 8. When the speed to decrease the radiation output is adjusted as such, it is possible to form the through hole 8 so as to have a steeper or more gradual inclination angle.

Further, with regard to the scanning radius of the laser beam LA, for example, when a speed to increase the scanning radius after the time t2 is increased more, it is possible for the depth of the surface of the through hole 8 to be scraped off by the laser beam LA to be further shallower from the through hole 8 toward the radial direction. This makes it possible to achieve a steeper inclination angle of the through hole 8. Further, when the speed to increase the scanning radius after the time t2 is decreased more, it is possible to deepen the depth of the surface of the through hole 8 to be scraped off by the laser beam LA from the through hole 8 toward the radial direction. This makes it possible to achieve a more gradual inclination angle of the through hole 8. When the speed to increase the scanning radius is adjusted as such, it is possible to form the through hole 8 so as to have a steeper sharper or more gradual inclination angle.

Further, needless to say, the present invention is not limited to the above embodiments, and various modifications can be made within a range which does not beyond a gist of the present invention that has been already described. For example, the laser drilling method according to the present embodiment is applicable to a case where an injection port of a nozzle for injecting a fluid is machined, other than the case where an injection port of a fuel injection valve of an injector is machined.

The invention claimed is:

1. A laser drilling method for performing drilling on a workpiece by use of a laser beam, the laser drilling method comprising:
    machining a through hole in the workpiece by radiating the laser beam to the workpiece such that the through hole extends from a bottom surface of the workpiece to a top surface of the workpiece; and
    scanning with the laser beam centered from the through hole toward a radial direction while changing a radiation output of the laser beam to form a hole within the workpiece between the bottom surface and the top surface,
    wherein a diameter of the hole changes between the bottom surface and the top surface such that the diameter increases from a lower end of the hole to an upper end of the hole,
    wherein the radiation output of the laser beam is changed to be smaller while scanning with the laser beam in the radial direction from the lower end of the hole to the upper end of the hole.

2. The laser drilling method according to claim 1, further comprising:
radiating the laser beam in an idling manner at a position inside a diameter of the through hole, after machining the through hole.

3. The laser drilling method according to claim 1, further comprising:
changing at least one of a pulse energy of the laser beam, a repetition frequency of a pulse interval of a pulse of the laser beam, a scanning speed of the laser beam, and a radiation time in the scanning with the laser beam, so as to change the radiation output of the laser beam.

4. The laser drilling method according to claim 1, further comprising:
radiating the laser beam to the workpiece so that a shape of the through hole is a circular shape or an elliptical shape in a top view.

5. The laser drilling method according to claim 1, further comprising:
scanning with the laser beam in a spiral manner at the time of the scanning with the laser beam centered around the through hole toward the radial direction.

* * * * *